United States Patent [19]

Swanson et al.

[11] 4,141,283

[45] Feb. 27, 1979

[54] PUMP UNLOADING VALVE FOR USE IN AGRICULTURAL TRACTOR LIFT SYSTEMS

[75] Inventors: William C. Swanson, Clarendon Hills; Imre Galos, Downers Grove, both of Ill.

[73] Assignee: International Harvester Company, Chicago, Ill.

[21] Appl. No.: 820,520

[22] Filed: Aug. 1, 1977

[51] Int. Cl.$^2$ .................... F15B 11/08; F16K 31/122

[52] U.S. Cl. .................................... 91/461; 251/28; 251/63.5; 251/122; 251/63

[58] Field of Search .................. 251/62, 63.5, 122, 31, 251/28, 63; 91/461, 462, 418; 137/115

[56] References Cited

U.S. PATENT DOCUMENTS

| | | | |
|---|---|---|---|
| 2,020,773 | 11/1935 | Ernst | 251/63 |
| 2,756,771 | 7/1956 | Spencer | 251/62 X |
| 2,905,190 | 9/1959 | Oyster | 137/115 |
| 3,285,287 | 11/1966 | Curran | 251/31 X |

*Primary Examiner*—Edgar W. Geoghegan
*Attorney, Agent, or Firm*—Douglas W. Rudy; Ronald C. Kamp; F. David AuBuchon

[57] ABSTRACT

An unloading valve spool with a tapered nose section is urged across a pair of unloading ports at a controlled rate eliminating violent upstream pressure generation. The unloading valve is subjected to equal system fluid pressure on each side of it as the spool is provided with a through passage that is dead headed on the back side of the unloading spool. A return spring urges the unloading spool to a normally closed position. An unloading piston prevents the unloading spool from closing too rapidly preventing the generation of a significant upstream pressure spike.

3 Claims, 2 Drawing Figures

PUMP UNLOADING VALVE FOR USE IN AGRICULTURAL TRACTOR LIFT SYSTEMS

BACKGROUND OF THE INVENTION

1. Field of the Invention

An unloading valve for use in a hydraulically operated hitch lift system for use on an agricultural tractor is provided. The unloading valve allows flow from a source of fluid to an auxiliary distribution valve when pressure requirements of the hitch lift cylinder are satisfied.

2. Description of the Prior Art

The prior art devices known to the applicants use a check ball, cradled in a spring loaded positioning member to act, as an unloading valve. The check ball was urged against the seat thus closing the unloading valve. An unloading piston was positioned to unseat this check ball to allow flow past the ball. The unloading piston carried a double spring loaded movable plunger and necessary retention hardware.

A detrimental pressure spike, occasionally rupturing fluid delivery lines and oil coolers, was generated upstream of this check ball upon its closing. The double springs in the unloading piston attempted to dampen the rapid reseating of the check ball as it contacted the movable plunger.

As the hitch control valve is moved to a position allowing the pressure signal on the back side of the unloading piston to decay the check ball was forced toward its seat by the spring loaded positioning member. The check ball through contact with the movable plunger of the unloading piston, pushed the unloading piston back toward a retracted position. The problem with the prior art devices occurred as the ball moved closer to its seat. Back pressure, due to pump flow restrictions, would increase and drive the ball faster toward its seat. This increase in acceleration caused instability of the check ball. In order to counter this acceleration the double spring and movable plunger was provided in the unloading piston with the intended function of dampening a portion of this instability. However, the lack of metering ability of the check ball as it moved against the seat resulted in a large overshoot or spike in hydraulic pressure upstream of the unloading valve.

The unloading valve described here overcomes the detrimental generation of this pressure spike.

SUMMARY OF THE INVENTION

In a hitch control system it is advantageous to provide an unloading valve operative to relieve system pressure either upon command of the vehicle operator or automatically as system pressure reaches a predetermined level. This disclosure teaches the use of an unloading valve that has the advantage of operating rapidly without generating an upstream pressure spike that is detrimental to the hitch control system and its attendant hardware such as oil coolers and hoses.

The unloading valve includes an unloading piston and an unloading spool carried in a common bore. The piston may force the unloading spool to unseat while indirectly controlling the reseating of the unloading spool. The unloading spool is provided with a tapered nose portion that is biased across a pair of unloading ports. The taper allows the spool to close the ports at a controlled rate upon the urging of the unloading spool reseating spring. In order to prevent biasing of the unloading spool by pressure on either side of the spool, which would force it to or off its seat, the spool is provided with a longitudinal bore allowing fluid communication past the nose of the spool into a closed chamber behind the unloading spool.

The advantage of this unloading valve over the prior art is that it can close at a more controlled rate thus preventing the momentary upstream pressure rise that has destroyed oil lines, oil coolers, and other hardware in the past. Associated with this is a decrease in noise and vibration usually an objectionable aspect of prior art devices.

Another significant advantage in this unloading valve is that the components necessary to its function are completely compatible with the prior art housing thus necessitating only small component replacement rather than the replacement of the entire valve block or body.

Furthermore, this invention is inexpensive to manufacture and depends on less than half the components of the prior art assembly.

In addition to minimizing the upstream pressure spike due to pump overshoot the improved unloading valve reduces the surge into the return lines leading from the valve to the reservoir.

DETAILED DESCRIPTION OF THE INVENTION

The advantages of this improved unloading valve will be apparent upon an understanding of the device as fully set forth below.

Figure 1:
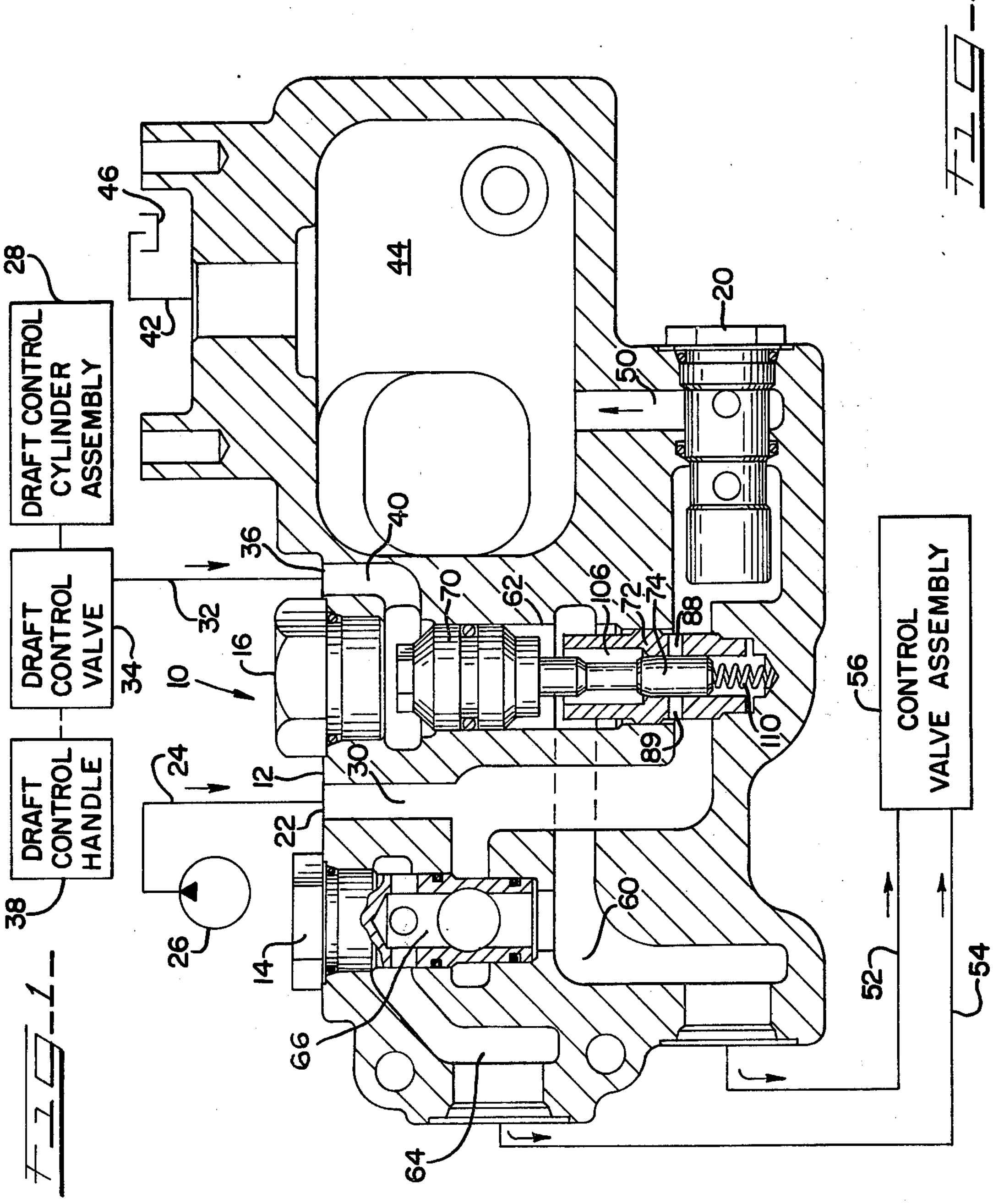
FIG. 1 presents a sectioned valve body incorporating the unloading valve of this invention as well as references to peripheral system equipment.

Looking first at FIG. 1 the environment of the actual unloading valve is shown. The valve as shown is used in conjunction with the hydraulically actuated hitch system used on agricultural tractors. The hydraulic hitch is well known in the art as are its components such as draft and position control circuits. Generally the operator presets a desired hitch position and the hitch adjusts to the setting. A hydraulic pump will supply fluid under pressure to operate a fluid motor or more commonly a cylinder having an internal piston to rotate a rock shaft which, through a rock shaft linkage, raises or lowers the hitch links. A draft control valve assembly is provided to sense the draft load imposed by an implement being dragged through the ground by the tractor. A draft control valve assembly will allow fluid to pass to the draft control cylinder to raise the implement to decrease the draft load or lower it to increase the load. The system will seek to maintain draft load setting chosen by the operator.

The unloading valve interrupts flow from the pump supplying the draft control cylinder when the draft control valve assembly is in neutral or has reached an equilibrium point relative to the operator's draft control setting.

The unloading valve assembly generally 10, includes a body 12 having a plurality of passages and bores. Three operating devices are housed in the body, including a simultaneous raised plug 14, the unloading valve component 16, and a system relief valve 20. A plurality of ports leading to internal passages are also provided.

A supply port 22 allows fluid flow from pump conduit 24 sourced at fluid pump 26 to enter internal supply passage 30. A draft control signal line 32 communicates a fluid pressure signal from the draft control valve represented by component representation 34 through port 36 communicating with draft control signal passage 40. Drain line 42 allows fluid communication between cavity 44 and reservoir 46. Internal passage 50 allows fluid exiting the system relief valve 20 to pass to the downstream reservoir 46. First and second control valve assembly conduits 52 and 54 connect the unloading valve assembly to the open center control valve assembly represented by box 56. The first conduit 52 allows fluid communication from internal passage 60 which opens into the unloading valve bore 62.

Internal passage 64 connects the bore 66 of the simultaneous raised plug 14 to second control valve assembly conduit 54.

Figure 2:
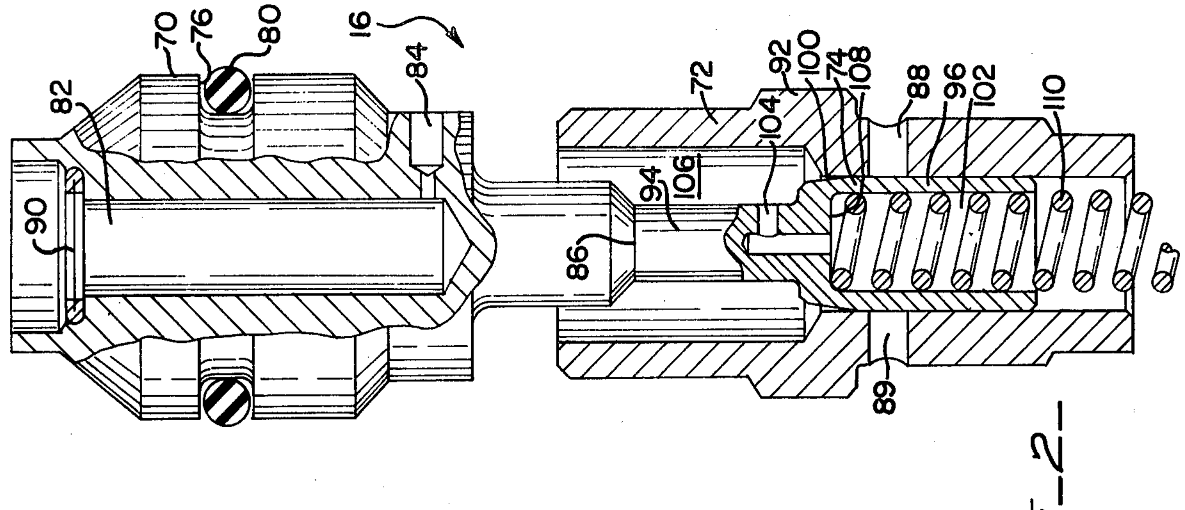
FIG. 2 is an enlarged view showing the unloading piston and unloading spool with broken away portions revealing internal passages.

The unloading valve components, generally 16 in both FIGS. 1 and 2 includes three basic parts, namely the unloading piston 70, an unloading spool body 72, and a tapered unloading spool 74.

FIG. 2 presents the details of these components. The unloading piston 70 is generally cylindrical having a series of different circumferences. The midsection of the piston 70 is provided with a circumferential groove 76 which accommodates a seal 80 such as the "O-ring" shown. A passage 82 is provided through the piston from above the seal 80 to a point below the seal. In the embodiment shown the passage extends vertically and longitudinally partway through the piston 70 and terminates in a lateral passage of reduced diameter such as orifice 84. Face surface 86 is the bottom termination point of the unloading piston. The unloading piston may accommodate a filtering screen 90 to prevent the passage of foreign material into the orifice 84.

The unloading spool body 72 is a cylindrical sleeve having a longitudinal bore for accommodating the unloading spool 74. The body is closely accommodated in the unloading valve bore 62. Cross ports 88 and 89 are formed through the unloading spool body in a location that may be subject to being open or closed relative to the position of the unloading spool 74. The unloading spool body 72 has a midsection band 92 compatible with the diameter of the unloading valve bore 62 preventing fluid flow through the valve bore around the outside of the unloading spool body. The tapered unloading spool 74 is an elongated cylindrical body having an extended nose portion 94 aligned for contact with the face surface 86 of the unloading piston 70. A larger diameter metering portion 96 of the unloading spool is integral with the nose portion 94. The metering portion includes a tapered section 100 having a gradually increasing diameter as the taper progresses from the nose portion of the unloading spool to the metering portion of the spool.

The tapered unloading spool 74 is further equipped with a longitudinal bore 102 extending partway through the unloading spool. This longitudinal bore is provided with a passage 104 that enables the communication of fluid from cavity 106 to the backside of the unloading spool such as area 108.

The unloading spool return spring 110 is provided to urge the unloading spool into a position preventing flow of fluid from cavity 106 to the cross ports 88 and 89.

OPERATION OF THE INVENTION

The invention incorporates the principle of metering pressure rise against the controllable change in the orifice area of the cross ports 88 and 89. This cross port orifice area change is accomplished by moving the tapered unloading spool 74 against the spring biasing force presented by the unloading spool return spring 110. The tapered section 100 of the unloading spool will uncover the cross ports 88 and 89 in the unloading spool body.

When a draft control valve 34 is in a neutral position a small amount of low pressure fluid passes through the check valve of the draft control cylinder assembly 28 into the draft control valve assembly 34. With the draft control valve 34 in the neutral position this small amount of fluid bleeds past the spool of the draft control valve and is directed through lines or passges 32 and 40 to the top side of the unloading piston 70. The unloading piston 70 is displaced inwardly in its bore 62 urging the tapered unloading spool 74 past the cross ports 88 and 89 allowing communication between these ports and allowing nearly all the pump 26 output to flow to an auxiliary circuit through the control valve assembly via passages 60 and 52.

At the initiation of a hitch position adjustment cycle the draft control handle 38 is moved to raise the hitch. Flow to the unloading valve from the draft control valve 34 is closed off which allows the unloading spool return spring 110 to urge the tapered unloading spool to close the cross ports 88 and 89. The tapered nose of the unloading spool gradually closes off these ports preventing the overshoot pressure spike common to the prior art devices.

Fluid pressure existing on each side of the unloading spool is equalized due to the existence of fluid passage 104 as seen in FIG. 2. As pressure on each side of the spool is equal the only force urging the spool across the cross ports 88 and 89 is the force generated by the spool return spring 110.

When a draft control cylinder assembly 28 has brought the hitch to a position corresponding to the position of the draft control handle 38 the unloading piston will again be subject to fluid pressure from the draft control valve 34 as was described above in the description of the neutral circuit. The unloading spool will be forced past the cross ports allowing the pump output to flow through cavity 106, internal passage 60 and first control valve conduit 52 to the control valve assembly for delivery to either an auxiliary circuit, an oil cooler or a sump (or any usual combination of circuits, coolers or filters downstream of the control valve assembly.

As said previously the controlled "soft" closing of the unloading spool when pump output is directed primarily to adjust the draft control cylinder 28 is accomplished through the combined tapered nose shape and internal fluid passage 104 provided in the instant invention. It is found that this invention is much more effective than the ball type unloading valve known in the prior art.

Thus it is apparent that there has been provided an unloading valve for use in conjunction with the hitch control system of an agricultural tractor that fully satisfies the objects and aims as set forth above. While the invention has been described in conjunction with specific embodiments thereof, it is possible that variations will be apparent to those skilled in the art in light of the foregoing description. Accordingly, this disclosure is intended to embrace all such variations as fall within the spirit and broad scope of the appended claims.

What is claimed is:

1. In a tractor vehicle having a hydraulically operated hitch including a fluid supply pump, a draft control valve assembly, a draft control cylinder assembly, a downstream control valve assembly and an unloading valve, the unloading valve comprising:

a body having a plurality of internal passages including an internal supply passage, an internal delivery passage and a draft control signal passage, the body also having an unloading valve bore to which said plurality of internal passages have access;

an unloading spool body having a longitudinal bore therethrough and a pair of cross ports perpendicular to the longitudinal bore through the unloading spool body, the unloading spool body carried in said unloading valve bore;

an unloading spool return spring carried in said unloading valve bore and located therein through said longitudinal bore of said unloading spool body;

a tapered unloading spool having a multiple diameter internal bore and an internal fluid passage allowing fluid communication between the internal bore and the exterior of the tapered unloading spool, the unloading spool having an extended nose portion dimensionally smaller than a tapered metering portion thereof;

an unloading piston slidably carried in said unloading valve bore segregating said draft control signal passage from said internal delivery passage for urging said tapered unloading spool against said unloading spool return spring force sufficiently far to uncover said pair of cross ports allowing fluid communiction therethrough and from said internal supply passage to said internal delivery passage.

2. The invention in accordance with claim 1 wherein said tapered unloading spool comprises:

a tapered metering portion having an internal bore and having an outside diameter substantially identical with the internal diameter of said longitudinal bore of said unloading spool body and a tapered section of gradually reduced concentric diameters at the midsection of said tapered unloading spool;

an extended nose portion of said tapered unloading spool extending beyond the tapered portion of said metering portion having an internal fluid passage connecting the exterior of the extended nose portion to the internal bore of said tapered metering portion.

3. In an unloading valve having a body with a plurality of internal passages including an internal supply passage, an internal delivery passage and a draft control signal passage as well as an unloading valve bore to which said plurality of passages have access the improvement comprising:

an unloading spool body having a longitudinal bore therethrough and a pair of cross ports perpendicular to the longitudinal bore through the unloading spool body, the unloading spool body carried in said unloading valve bore, an unloading spool return spring carried in said unloading valve bore and located therein through said longitudinal bore of said unloading spool body;

a tapered unloading spool having a multiple diameter internal bore and an internal fluid passage allowing fluid communication between the internal bore and the exterior of the tapered unloading spool, the unloading spool having an extended nose portion dimensionally smaller than a tapered metering portion thereof;

an unloading piston slidably carried in said unloading valve bore segregating said draft control signal passage from said internal delivery passage for urging said tapered unloading spool against said unloading spool return spring force sufficiently far to uncover said pair of cross ports allowing fluid communication therethrough and from said internal supply passage to said internal delivery passage.

* * * * *